Aug. 30, 1932.　　　　F. J. KELLY　　　　1,874,756
POWER TRANSMITTING DEVICE
Filed Oct. 21, 1931
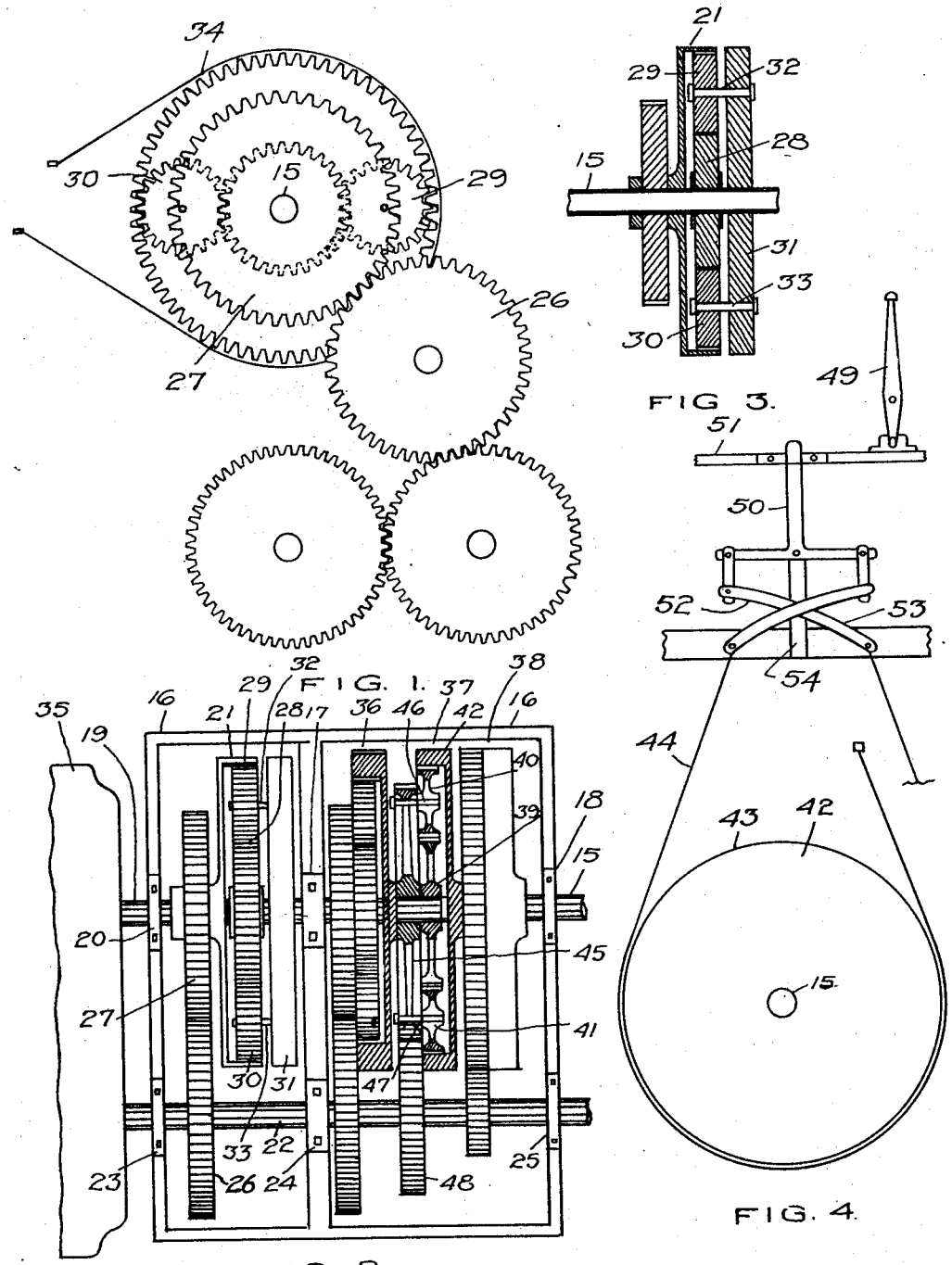
INVENTOR.
F. J. Kelly
ATTORNEY.

Patented Aug. 30, 1932

1,874,756

UNITED STATES PATENT OFFICE

FRANK JOSEPH KELLY, OF QUEBEC, QUEBEC, CANADA

POWER TRANSMITTING DEVICE

Application filed October 21, 1931. Serial No. 570,081.

The invention relates to a power transmitting device, as described in the present specification and illustrated in the accompanying drawing that forms part of the same.

The invention consists essentially in the application of a retarding member to one or more gears of a set in order to put in action the remaining gears of that set for the rotation of the propelling shaft, as pointed out in the claims for novelty following a description in detail of the preferred construction and assembly of the gears.

The objects of the invention are to eliminate the delicate mechanism of clutch members and the complicated operations incidental to the shifting of gears or clutches, thereby simplifying the transmission of power from a prime mover to the driven mechanism and at the same time reducing the cost of maintenance and economizing in the matter of lubrications; to lower the cost in the construction of transmission sets in motor cars, motor boats and other conveyances as well as in stationary plants and effect constant and reliable engagement of the driving and driven members in a standard and efficient type of gear; to facilitate the driving of motor cars and motor conveyances by utilizing very simple change speed methods and in this connection varying the speed almost instantaneously irrespective of the speed of the engine shaft; and generally to provide sets of gears in as many speeds as may be desired and reverse gear mechanisms that may be operated by the application of the braking principle.

In the drawing, Figure 1 is a plan view showing a train of gears, connecting the engine shaft to the propelling shaft.

Figure 2 is an elevational view of the assembled gears including the brake members.

Figure 3 is a sectional detail of the reverse mechanism.

Figure 4 is a detail of the band brake mechanism and operating member.

Like numerals of reference indicate corresponding parts in the various figures.

Referring to the drawing, the engine shaft, indicated by the numeral 15 extends into the casing or gear box 16 and is journalled in the bearings 17 and 18 and the propelling or transmission shaft 19 is journalled in the bearings 20 at the opposite end of the gear box and supported in the hub of the internal gear 21.

The counter shaft 22 is journalled in the bearings 23, 24 and 25 in the end of the gear box and intermediate of the length of the gear box, and is parallel to the engine and propeller shafts.

The coacting spur gears 26 and 27 are fixedly mounted on the counter shaft 22 and the transmission shaft 19 respectively for driving purposes.

The internal gear 21 is fixed in relation to the gear 27 and the planetary gears comprising the central driving gear 28 fixedly mounted on the engine shaft 15 coacts with the planet gears 29 and 30 which in turn coact with the internal gear 21.

The brake drum 31 is loosely mounted on the engine shaft 15 adjacent to the driving gear 28 and the stub shafts 32 and 33 project outwardly from the brake drum 31 into the internal gear member 21 and the planet gears 29 and 30 are loosely mounted on these shafts.

The brake band 34 engages the rubbing periphery of the brake drum 31 and brings it to a stop. The driving gear 28, which is driven by the engine or motor 35 is in coaction with the planet gears 29 and 30 and these in turn are in coaction with the internal gear 21, consequently the transmission shaft 19 will be driven in a reverse direction in respect to the rotation of the driving gear 28.

The variable speed sets 36, 37 and 38 for the forward movement are in each instance the same arrangement of gears and retarding members, though varying as to gear dimensions, so the same numerals will cover each set.

The fixed central gear 39 on the engine shaft corresponds to the driving gear 28 already described and is the operating member of the planetary set, the gears 40 and 41 being planet gears coacting with the internal gear 42 loosely mounted on the engine shaft 15, and having an outer rubbing periphery 43 engaged by the brake band 44.

The driven gear 45 is loosely mounted on the engine shaft and carries the stub shafts 46 and 47 in rotation and the planet gears 40 and 41 are loosely mounted on these stub shafts, consequently when the brake band 44 is tightened on the retarding internal gear 42 the planet gears 40 and 41 will run around the internal gear 42 and drive the gear 45 in the same direction as the driving gear 39.

The gear 48 forming one of the train of gears to the propelling or transmission shaft is fixedly mounted on the counter shaft 22 and the rotation of the driven gear 45 will be communicated through the coacting gears 26 and 27 to the transmission shaft.

The same operation occurs in all of the gears of the sets 36, 37 and 38 on the tightening of one or the other of the brake bands around the internal gear 42, and it will be noticed that the driven gears in the sets 37 and 38 increase in diameter in respect to one another and to the driven gear in the set 36 with a corresponding decrease in the counter shaft gears 48, consequently the speed of rotation of a transmission shaft will be governed entirely by the choice of brake bands operated in relation to the sets 36, 37 or 38.

The brake bands 44 at one end are secured to the wall of the gear box 16 in the interior thereof, and at the other end are secured to mechanism operated by a standard gear controlled lever 49. This lever is not part of the invention and is only shown and described to complete the understanding of the operation of the transmission and it comprises in each instance an inverted T-lever 50 extending through a bar 51 and tilted by the sliding of said bar through the manipulation of the hand lever 49, the rocking of the T ends of this lever 50 affects the toggle joints 52 and 53 crossed and pivoted in the post 54, these toggles being secured to the brake band and straddling the distance from the reverse set of gears to the set 36, while similar toggles straddle the distance from the set 37 and set 38. Therefore by the movement of the lever 49 forwardly the reverse mechanism is brought into play and and by the movement of the lever 49 rearwardly the first gear is brought into play, and by switching over the lever to the other bar, the forward movement brings the gear set 37 or second gear into play, and by the movement of it rearwardly, the set 38 or high gear is brought into play, consequently so far as driving a motor vehicle is concerned, precisely the same actions occur in respect to reverse and forward movements and there need be no change of manual operations by the driver, which is a very important thing when it is taken into consideration that under present methods, nearly all persons have learned to drive and to adopt entirely new methods would cause very much confusion and innumerable accidents.

In the operation of the several gear sets, simplicity is assured, for in bringing the transmission into first gear the brake band is brought into play and the internal gear retarded, the planet gears run around the internal gear and operate the driven gear and through the counter shaft gears rotate the transmission shaft.

Meanwhile the other gears are idle, there being no coaction between the driven gears of the sets 37 and 38 and the constantly meshed counter shaft gears. Also the internal gears of sets 37 and 38 and planet gears are simply idly moving in respect to their driving gears. Similarly the reverse set is also idly moving in respect to its driving gear, all being quite free and in their idle movements simply facilitating their lubrication and their coaction when brought into play.

What I claim is:—

1. In a power transmitting device, a gear box having end and intermediate bearings, a driving shaft journalled in an end and intermediate bearing, a transmission shaft journalled in an end bearing, a countershaft journalled in end and intermediate bearings, a reverse set of planetary gears and brake rubbing member including an internal gear forming a shaft support, a plurality of planetary gear sets including driving gears and planet gears operating in internal gears forming brake rubbing members, driven gears carrying said planet gears and coacting counter gears fixedly mounted on said countershaft, connecting gears mounted on said countershaft and transmission shaft respectively, and band brakes suitably operated and engaging said rubbing members.

2. In a power transmitting device, a gear box having end and intermediate bearings, a driving shaft journalled in an end and intermediate bearing, a transmission shaft journalled in an end bearing, a countershaft journalled in end and intermediate bearings, a reverse gear set having an internal gear and hub fixedly mounted on said transmission shaft and coacting gears fixedly supported from said driving shaft, a brake drum directly connected to certain of said gears, a plurality of planetary gear sets including driving gears and planet gears operating in internal gears forming brake rubbing members, driven gears carrying said planet gears and coacting counter gears fixedly mounted on said countershaft, connecting gears mounted on said countershaft and transmission shaft respectively and band brakes suitably operated and engaging said rubbing members.

3. In a power transmitting device, a gear box having end and intermediate bearings, a driving shaft journalled in an end and intermediate bearing, a transmission shaft journalled in an end bearing, a countershaft journalled in end and intermediate bearings, a reverse gear set bridging the distance between said driving shaft and said transmission shaft and having a brake drum member, a plurality of planetary gear sets including driving gears and planet gears operating in internal gears forming brake rubbing members, driven gears carrying said planet gears and coacting counter gears fixedly mounted on said countershaft, connecting gears mounted on said countershaft and transmission shaft respectively and band brakes suitably operated and engaging said rubbing members.

4. In a power transmitting device, a gear box having end and intermediate bearings, a driving shaft journalled in an end and intermediate bearing, a transmission shaft journalled in an end bearing, a countershaft journalled in end and intermediate bearings, a reverse set of planetary gears and brake rubbing member including an internal gear forming a shaft support, a plurality of planetary gear sets including driving gears and planet gears operating in internal gears forming brake rubbing members, driven gears carrying said planet gears and coacting counter gears fixedly mounted on said countershaft, connecting gears mounted on said countershaft and transmission shaft respectively, band brakes fixedly secured at one end to said gear box, and brake operating mechanism having sliding bars operatively connected to rockers with toggle connections to the other ends of said bands and a manually operated lever engaging said bars for applying the band brakes individually in accordance with forward and back movements.

Signed at Quebec City, Canada, this 17th day of July, 1931.

FRANK JOSEPH KELLY.